J. V. V. Booraem,
Boiler-Tube Joint.
N° 40,013        Patented Sep. 22, 1863.
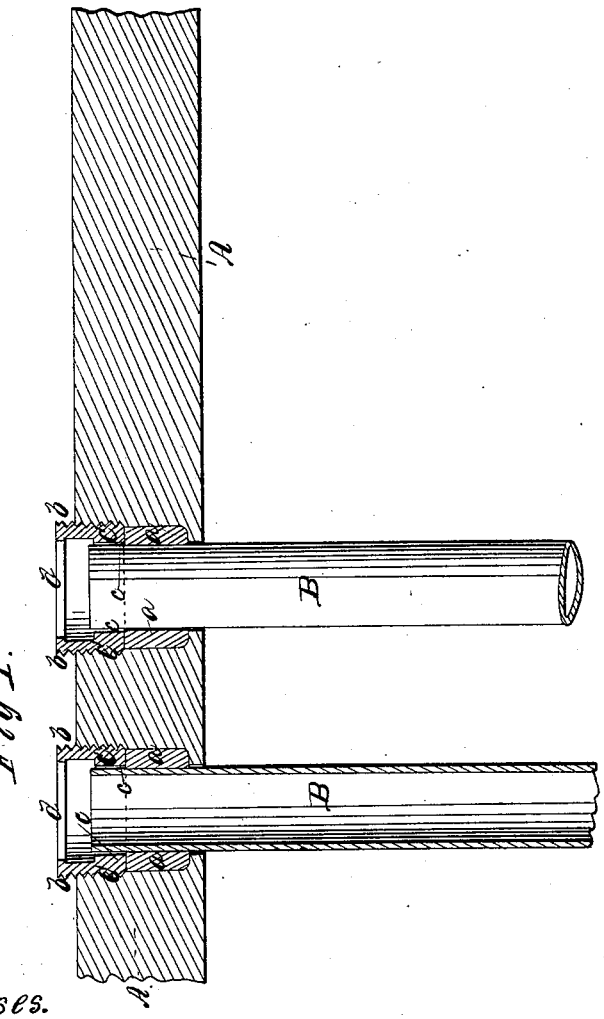
Witnesses.
Inventor
J V V Booraem

UNITED STATES PATENT OFFICE.

JOHN V. V. BOORAEM, OF JERSEY CITY, NEW JERSEY.

IMPROVEMENT IN JOINTS FOR TUBES OF SURFACE-CONDENSERS.

Specification forming part of Letters Patent No. 40,013, dated September 22, 1863.

*To all whom it may concern:*

Be it known that I, JOHN V. V. BOORAEM, of Jersey City, in the county of Hudson and State of New Jersey, have invented a new and Improved Joint for the Tubes of Surface-Condensers; and I do hereby declare that the following is a full, clear, and exact description of the same, reference being had to the accompanying drawings, forming part of this specification, in which—

Figure 1 is a sectional view of a tube-sheet and two tubes, illustrating the construction of the joint. Fig. 2 is an end view of one of the screwed thimbles employed in making the joints.

Similar letters of reference indicate corresponding parts in both figures.

The principal object of my invention is to provide for the removal of any one of the tubes of a condenser for repair or any other purpose without disturbing the others, and at the same time to provide for the free longitudinal expansion of the tubes; and to this end it consists in forming the joint between a tube and tube-sheet by means of a thimble passing over the end of the tube and screwing into the tube-sheet, and a ring or gasket of india-rubber or other packing material, which is inserted into a cavity in the sheet and compressed around the tube by means of the thimble in such manner as to make a steam-tight joint, but freely permit the longitudinal expansion of the tube.

To enable others skilled in the art to make and use my invention, I will proceed to describe its construction and operation.

A is the tube-sheet, and B B are the tubes. The sheet is made stout enough to resist the pressure of the atmosphere, and for the reception of the thimbles C C and packing *a a*, which form the joint. The holes provided in the said sheet for the tubes are only just large enough in the inner portion of the sheet for the tubes to pass freely through, but are counterbored from the outer side of the sheet to form stuffing-boxes for the reception of the packing and the thimbles, and have screw-threads cut in them for the thimbles to screw into.

The packing *a a*, round each tube, may be composed of one or more rings, of india-rubber or of other material suitable for packing. The thimbles C C have screw-threads *b b* cut on their exteriors to fit the female screw-threads in the holes of the tube-sheet. Their inner ends have circular openings *c c*, in which the tubes fit easily, and their outer ends are represented by square openings *d d*, (see particularly Fig. 2,) for the reception of a square-ended wrench or key by which to screw them into their places.

To make the joints the tubes are slipped into the holes in the tube-sheet, the packing-rings *a a* slipped over them, and the thimbles screwed into the holes to compress the packing as tightly as necessary around the tubes. To remove a tube its thimbles are unscrewed and taken out, and it can be at once drawn through the tube-sheet, none of the other tubes being disturbed by the operation, or, if it be desired to plug up a tube, the thimble need offer no obstacle to so doing, as, if the opening be large enough, the plug may be driven right through the thimble into the tube, or, if the plug cannot be driven through the opening *d*, the thimble can be taken out before inserting the plug, and replaced after the invention. I prefer, however, when it is desired to close a tube, to substitute a cap for the thimble, such cap screwing into the plate in the same manner as the thimble.

In the use of some kinds of packing it may be desirable to interpose a metal washer between the thimble and the packing.

What I claim as my invention, and desire to secure by Letters Patent, is—

Forming the joint between the tube and tube sheet by means of a packing, *a*, of india-rubber or other suitable material, surrounding the tube, and a hollow screwed thimble passing over the tube and screwing into the tube-sheet, substantially as herein specified.

JOHN V. V. BOORAEM.

Witnesses:
THOS. S. J. DOUGLAS,
M. M. LIVINGSTON.